May 7, 1935. E. GREENFIELD ET AL 2,000,592
SUPPORT
Filed Feb. 8, 1933 2 Sheets-Sheet 1
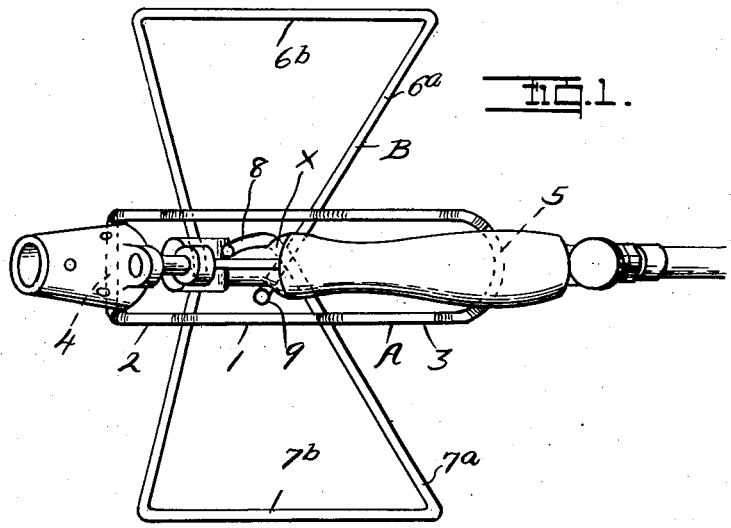
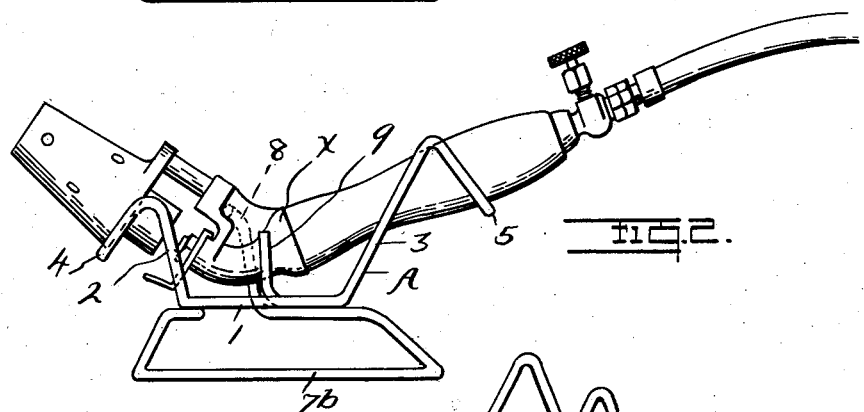
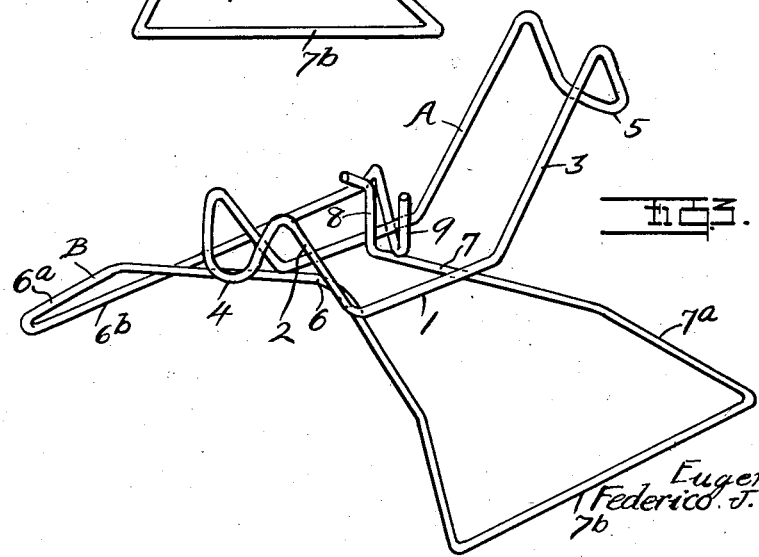
Inventors
Eugene Greenfield
Federico J. Thibault

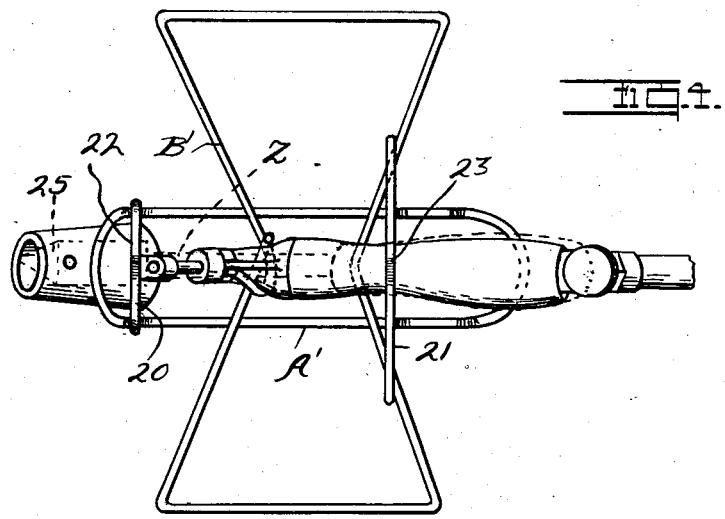
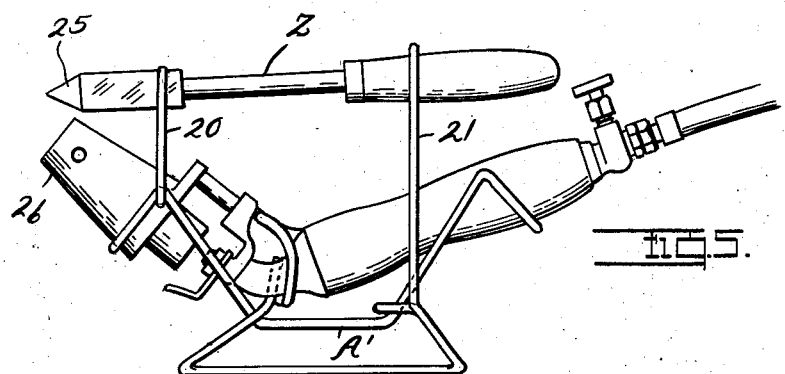
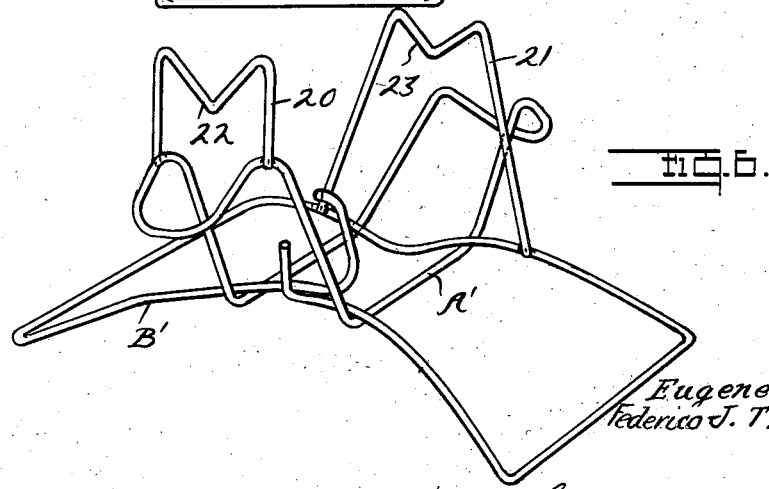

Patented May 7, 1935

2,000,592

UNITED STATES PATENT OFFICE 2,000,592

SUPPORT

Eugene Greenfield and Federico J. Thibault, Detroit, Mich., assignors to Liquefied Gas Development Company, Detroit, Mich., a corporation of Michigan Application February 8, 1933, Serial No. 655,820

12 Claims. (Cl. 126—229).

This invention relates generally to stands and refers more particularly to a portable stand for supporting soldering equipment.

One of the essential objects of the invention is to provide a stand of this type wherein a cradle is provided for supporting soldering equipment such as a blow torch safely while lit and while cooling.

Another object is to provide a stand wherein the cradle is supported upon an arched base having substantially parallel runners for engagement with the ground, flooring or other suitable surface.

Another object is to provide a stand wherein portions of the arched base are fashioned to hold the torch in the cradle.

Another object is to provide a stand wherein the holding means and arched base are constructed and arranged in such a way that the torch will be prevented from wobbling or snaking over the ground, flooring, etc.

Another object is to provide a stand wherein the arched base aforesaid is constructed so that it may be readily secured to a horizontal, inclined or upright surface as desired.

Another object is to provide a stand wherein means is provided for holding a soldering iron so that the soldering point thereof may be heated by flames issuing from the blow torch in the cradle.

Other objects, advantages and novel details of construction of this invention wil be made more apparent as this description proceeds, especially when considered in connection with the accompanying drawings, wherein:

Figure 1 is a top plan view of a stand embodying our invention and showing a torch applied thereto;

Figure 2 is a side elevation of the construction illustrated in Figure 1;

Figure 3 is a perspective view of the stand;

Figure 4 is a view similar to Figure 1 but showing a slight modification;

Figure 5 is a side elevation of the construction illustrated in Figure 4;

Figure 6 is a perspective view of the stand illustrated in Figures 4 and 5.

Referring now to the drawings, A is the cradle and B is the supporting base of a stand embodying our invention. As shown, the cradle A is formed from a single length of heavy gauge wire and has a substantially flat base portion 1, upwardly inclined portions 2 and 3, respectively, at opposite ends of said base portion, and depending U-shaped end portions 4 and 5, respectively, at the upper ends of said inclined portions. Preferably the inclined portion 2 is shorter than the inclined portion 3 and the depending portion 5 is longer than the depending portion 4. The base B is also formed from a single length of wire and has laterally spaced sides 6 and 7 and longitudinally curved substantially triangular-shaped legs 6ª and 7ª. Preferably this base crosses and is welded to the base 1 of the cradle. The ground engaging portions 6ᵇ and 7ᵇ, respectively of the legs 6ª and 7ª are preferably parallel and form runways for the stand. Portions 8 and 9, respectively, of the base formed by the free ends of the wire extend upwardly at the base 1 and are fashioned as shown to hold a torch such as X in the cradle A.

In use, the torch X may be easily and quickly placed in or removed from the cradle A between the holding portions 8 and 9 and the stand may be readily secured to or moved over any suitable surface. In this connection it will be noted that the construction of the stand is such that the torch will be prevented from wobbling or snaking when the stand is moved, hence may be moved about safely while in the cradle. Likewise the construction is such that the flames issuing from the torch when lit will be directed away from the ground or flooring, hence the equipment may be used safely on wood flooring.

In Figures 4 to 6, inclusive, we have illustrated a slight modification wherein inverted substantially U-shaped members 20 and 21 extend upwardly from the cradle A' and base B', respectively, and have depending substantially V-shaped portions 22 and 23, respectively, at their upper ends for supporting a soldering iron such as Z. Preferably the U-shaped portion 21 extends slightly above the U-shaped portion 20 and the V-shaped portion 23 is at a higher point that the V-shaped portion 22 so that the soldering iron Z will be supported in a somewhat inclined position with its soldering point 25 just above and adapted to be heated by flames issuing from the mixing chamber 26 of the torch.

What we claim as our invention is:

1. A stand of the class described, comprising an arched base, a cradle for receiving and supporting a blow torch extending across and secured to said base, and means projecting from the base into the cradle for holding the blow torch against accidental displacement.

2. A stand of the class described, comprising a base, a cradle for receiving and supporting a blow torch extending across and secured to said base, and means for holding the blow torch in the cradle including projections on the base formed to permit substantially vertical movement of the blow torch relative to the base but to prevent endwise or horizontal movement thereof.

3. A stand of the class described, comprising a base, a cradle for receiving and supporting a blow torch extending across and secured to said base, and means for holding the blow torch in the cradle including a pair of cooperating upstanding projections on the base.

4. A stand of the class described, comprising a cradle having portions for receiving and supporting a blow torch, a base for supporting the cradle, and means for supporting a soldering iron above the cradle so that the soldering point thereof will be adjacent and heated by flames issuing from the torch, including means projecting upwardly from the cradle and base respectively.

5. A stand of the class described, comprising a cradle, and a supporting base therefor, the cradle being formed from a single length of wire, and provided at opposite ends thereof with upwardly opening substantially U-shaped portions, and the base being also formed from a single length of wire and having portions thereof extending upwardly into the cradle for holding a blow torch therein.

6. A stand of the class described, comprising a cradle, and a supporting base therefor, the cradle being provided at opposite ends thereof with upwardly opening substantially U-shaped portions, and the base having portions thereof extending upwardly into the cradle for holding a blow torch therein.

7. A stand of the class described, comprising an elongated cradle having upwardly opening substantially U-shaped portions at opposite ends thereof for the reception of a blow torch, and a supporting base for said cradle secured thereto intermediate of its ends and having projections within the cradle serving to hold the blow torch therein.

8. A stand of the class described, comprising an arched elongated base, opposite ends of said base being relatively wide and constituting supporting legs, the intermediate arched portion of said base being relatively narrow, and an elongated cradle extending across and secured to said narrow portion, opposite ends of said cradle being elevated with respect to the narrow portion and formed for the reception of a blow torch.

9. A stand of the class described, comprising a base, an elongated cradle extending across said base and having means for receiving and supporting a hand-operated blow torch, and means for supporting a soldering iron above the cradle so that the point of said iron will be adjacent and heated by flames issuing from said torch, including uprights carried respectively by said base and cradle.

10. A stand of the class described comprising a base formed of wire, a cradle for receiving and supporting a blow torch extending across and secured to said base, and means for holding the blow torch against accidental displacement from the cradle including portions of the wire projecting into the cradle.

11. A stand of the class described comprising a base formed of wire, a cradle extending across and secured to said base and having means for receiving and supporting a hand operated blow torch, portions of the wire forming the base projecting into the cradle and cooperating with each other to hold a blow torch in said cradle, and means for supporting a soldering iron above the cradle so that the point of said iron will be adjacent and heated by flames issuing from said torch, including uprights at spaced points of said cradle carried by said cradle and base respectively.

12. A stand of the class described comprising a base, an elongated cradle extending across and secured to said base, said cradle having means for receiving and supporting a hand operated blow torch, and said base having portions projecting into said cradle for holding a blow torch therein, and means at spaced points longitudinally of said cradle for supporting a soldering iron above the cradle so that the point of the iron will be adjacent and heated by flames issuing from said torch.

EUGENE GREENFIELD.
FED. J. THIBAULT.